J. SOLLENBERGER.
Hop-Vine Trainer.

No. 10,745.

Patented Apr. 4, 1854.

UNITED STATES PATENT OFFICE.

JOSEPH SOLLENBERGER, OF HIGGINSPORT, OHIO.

IMPROVEMENT IN TRAINING VINES.

Specification forming part of Letters Patent No. 10,745, dated April 4, 1854.

*To all whom it may concern:*

Be it known that I, JOSEPH SOLLENBERGER, of Higginsport, Brown county, Ohio, have invented a new and useful Training-Post for Grape-Vines, &c.; and I hereby declare the following to be a full, true, and exact description of the same, reference being had to the annexed drawings, making part of this specification.

My invention consists in a training-post for grape-vines, to avoid the necessity of tying the vine to the stake, pole, or frame from time to time during the season.

My method of training and pruning is exemplified in the accompanying drawings. A number of wires attached at suitable distances up the post are curved or bent into the form of hooks or claws of such size and form as to readily receive the vine-stalks and to hold them securely when inserted.

Figure 3:
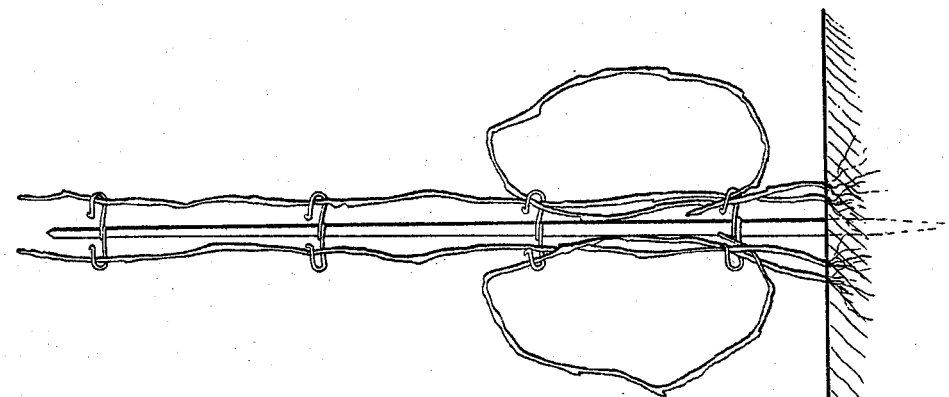
Figure 2:
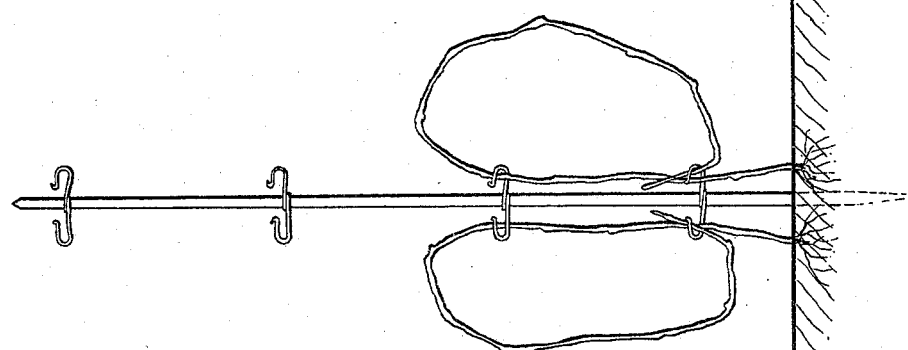
Figure 1:
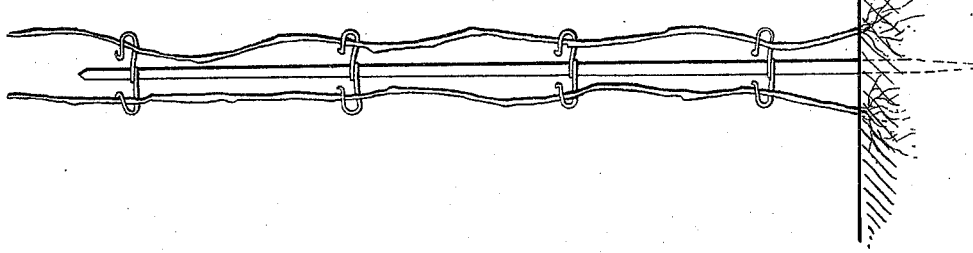

Figure 1 shows the vine as it appears in fall, with wood of first year's growth. In the succeeding winter the vine is cut to a height of three to six feet, and is bowed over, as shown in Fig. 2. The object of this is to retard the sap, which has a tendency to the end shoots. Fig. 3 shows the vine in the fall of the second year, (first of bearing,) in which the bow has produced fruit and a cane has been left for fruit of the third year. In the winter the bow is cut off, and the cane of the second year's growth is bowed, &c. The stakes used for this purpose, being of black locust or mulberry, will last many years, and my object is to avoid the necessity of constant tying, or (which is less troublesome, but at the same time less neat, and inferior as a matter of treatment) letting them grow the height of the stake before tying. It is usual in the winter treatment to tie with willow and in the summer with rye-straw or matting; and this work has to be done frequently if a neat vineyard is desired, otherwise the canes interlace and entwine, their tendrils being difficult to detach and too much shading the fruit, which is at that time in full process of enlarging. By my management the vine-dresser may pass through quickly and just place the growing cane within the grasp of the curved wires, which are attached to the post.

In early summer, when the vines are growing fast, great numbers of the more early ones are (in consequence of the present laborious method of training) unavoidably suffered to trail over the ground until a certain proportion of the vines are ready for training—that is, the height of the stake or more—and in being so left do not thrive as they would if earlier trained and presented to the genial influences of the sun and air; but in a vineyard furnished with my training-posts the dresser may, as soon as any shoots have attained a length sufficient to reach the first hooks on the posts, go quickly through the vineyard and insert these forward ones in the lower hooks, and repeat this every few days, and thus have them all trained as they advance more perfectly and with far less labor than with the tying process.

Another advantage incident to my method is the more free exposure of the vines to the sun and air than where a number of stalks and the training-pole are tied closely together, which I believe to be one of the chief causes of the mildew, at present so destructive to the grape crops, and in this opinion I am sustained by that of some of the most experienced vine-dressers in these parts.

With the usual plan, where all the stalks and leaves are closely huddled around the post, the moisture remains about and among them until the sun is far advanced, and results in what is known as "scalding, rotting, &c."

By my method before explained of spreading the vines open to the sun and air the injuries aforementioned and consequent loss resulting from the old method of treatment are guarded against, and the vine soon becomes permanently fixed in the desired position by the tendrils, which, entwining among the hooks, prevent any possible dislodgment by the wind or otherwise.

I do not claim a post in itself, nor a wire hook in itself; but

What I do claim, and desire to secure by Letters Patent, is—

A training-post composed of a staff, and hooks at proper intervals on the staff for the purpose of rapidly treating and dressing vines in the manner described and at the proper season, the staff and hooks being prepared and located all ready for instant action when the season for vine-dressing arrives, the whole being combined and used substantially in the manner and for the purpose described.

In testimony whereof I have hereunto set my hand before two subscribing witnesses.

JOSEPH SOLLENBERGER.

Witnesses:
GEO. H. KNIGHT,
J. H. GETZENDANNER.